(12) United States Patent
Takeda et al.

(10) Patent No.: US 11,638,277 B2
(45) Date of Patent: Apr. 25, 2023

(54) TERMINAL, RADIO COMMUNICATION METHOD, BASE STATION AND SYSTEM FOR TRANSMITTING PHYSICAL UPLINK SHARED CHANNEL BASED ON TIME DOMAIN RESOURCE ALLOCATION LIST

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 34 days.

(21) Appl. No.: 17/044,664

(22) PCT Filed: Apr. 5, 2018

(86) PCT No.: PCT/JP2018/014644
§ 371 (c)(1),
(2) Date: Oct. 1, 2020

(87) PCT Pub. No.: WO2019/193733
PCT Pub. Date: Oct. 10, 2019

(65) Prior Publication Data
US 2021/0045139 A1 Feb. 11, 2021

(51) Int. Cl.
*H04W 72/12* (2009.01)
*H04W 72/1263* (2023.01)
(Continued)

(52) U.S. Cl.
CPC ....... *H04W 72/1263* (2013.01); *H04L 1/0061* (2013.01); *H04W 72/042* (2013.01);
(Continued)

(58) Field of Classification Search
CPC .......... H04W 72/1263; H04W 72/042; H04W 72/0446; H04W 72/14; H04W 74/0833; H04W 76/11; H04L 1/0061
See application file for complete search history.

(56) References Cited

U.S. PATENT DOCUMENTS

2010/0279628 A1* 11/2010 Love ............... H04L 5/0091
455/70
2010/0331030 A1* 12/2010 Nory ............... H04W 72/0426
455/63.1

(Continued)

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).

(Continued)

*Primary Examiner* — Jael M Ulysse
(74) *Attorney, Agent, or Firm* — Osha Bergman Watanabe & Burton LLP

(57) ABSTRACT

A user terminal according to an aspect of the present disclosure includes a receiving section that receives downlink control information (DCI) indicating transmission of an uplink shared channel, and a control section that determines that a size of a time domain resource allocation (RA) field included in the DCI is different depending on a format of the DCI to control the transmission of the uplink shared channel based on the field. According to one aspect of the present disclosure, the number of candidates of the PUSCH time domain RA can be appropriately controlled.

5 Claims, 7 Drawing Sheets

| index | K2  | SLIV      |
|-------|-----|-----------|
| 0     | X   | S=0, L=7  |
| 1     | X-1 | S=7, L=7  |
| 2     | X-1 | S=0, L=7  |
| ...   | ... | ...       |
| 14    | X-7 | S=7, L=7  |
| 15    | X-7 | S=0, L=7  |

(51) Int. Cl.
*H04W 76/11* (2018.01)
*H04L 1/00* (2006.01)
*H04W 72/04* (2023.01)
*H04W 72/0446* (2023.01)
*H04W 72/044* (2023.01)
*H04W 72/14* (2009.01)
*H04W 74/08* (2009.01)

(52) U.S. Cl.
CPC ... *H04W 72/0446* (2013.01); *H04W 72/0466* (2013.01); *H04W 72/14* (2013.01); *H04W 74/0833* (2013.01); *H04W 76/11* (2018.02)

(56) References Cited

U.S. PATENT DOCUMENTS

| | | | | |
|---|---|---|---|---|
| 2013/0016672 A1* | 1/2013 | Yang | H04L 5/001 370/329 |
| 2014/0086224 A1* | 3/2014 | Kwon | H04W 74/0833 370/336 |
| 2014/0355539 A1* | 12/2014 | Yang | H04L 1/1893 370/329 |
| 2015/0264667 A1* | 9/2015 | Lee | H04L 5/0048 370/329 |
| 2015/0271790 A1* | 9/2015 | Lee | H04W 72/042 455/450 |
| 2015/0296533 A1* | 10/2015 | Park | H04L 1/1893 370/329 |
| 2016/0100422 A1* | 4/2016 | Papasakellariou | H04L 1/0029 370/329 |
| 2017/0034808 A1* | 2/2017 | Ouchi | H04W 52/221 |
| 2017/0135084 A1* | 5/2017 | Kuchibhotla | H04W 72/0406 |
| 2018/0006790 A1* | 1/2018 | Park | H04L 1/1887 |
| 2018/0048447 A1* | 2/2018 | Nogami | H04B 7/0626 |
| 2018/0049169 A1* | 2/2018 | Lin | H04L 27/26025 |
| 2018/0220400 A1* | 8/2018 | Nogami | H04L 5/0053 |
| 2018/0279297 A1* | 9/2018 | Nogami | H04L 1/1854 |
| 2019/0150123 A1* | 5/2019 | Nogami | H04L 5/0053 370/330 |
| 2019/0150124 A1* | 5/2019 | Nogami | H04L 5/0094 370/330 |
| 2019/0165894 A1* | 5/2019 | Choi | H04W 24/10 |
| 2019/0394759 A1* | 12/2019 | Ying | H04W 76/27 |
| 2021/0014005 A1* | 1/2021 | Ying | H04L 1/1887 |

OTHER PUBLICATIONS

3GPP TSG RAN WG1 Meeting #92; R1-1802042 "Discussion on DCI format design" CMCC; Athens, Greece; Feb. 26-Mar. 2, 2018 (7 pages).

3GPP TSG RAN WG1 Meeting #92; R1-1801533 "Remaining details on DCI content and formats" vivo; Athens, Greece; Feb. 26-Mar. 2, 2018 (5 pages).

3GPP TSG RAN WG1 Meeting #92; R1-1802482 "DCI contents and formats" NTT DOCOMO, Inc.; Athens, Greece; Feb. 26-Mar. 2, 2018 (7 pages).

International Search Report issued in International Application No. PCT/JP2018/014644, dated Jul. 3, 2018 (5 pages).

Written Opinion issued in International Application No. PCT/JP2018/014644; dated Jul. 3, 2018 (4 pages).

Extended European Search Report issued in Application No. 18913610.4 dated Nov. 5, 2021 (10 pages).

LG Electronics "Discussion on compact DCI format design" 3GPP TSG RAN WG1 Meeting #92, R1-1802226, Athens, Greece, Feb. 26-Mar. 2, 2018 (5 pages).

Ericsson "Summary of 7.1.3.1.4 (DCI contents and formats)" TSG-RAN WG1 #92, R1-1803232, Athens, Greece, Feb. 26-Mar. 2, 2018 (19 pages).

ITRI "Discussion on DCI format 0-0/0-1" 3GPP TSG RAN WG1 Meeting #92bis, R1-1803965, Sanya, China, Apr. 16-20, 2018 (8 pages).

* cited by examiner

FIG. 1A

| index | K2 | SLIV |
|---|---|---|
| 0 | X | S=0, L=7 |
| 1 | X-1 | S=7, L=7 |
| 2 | X-1 | S=0, L=7 |
| ... | ... | ... |
| 14 | X-7 | S=7, L=7 |
| 15 | X-7 | S=0, L=7 |

FIG. 1B

| index | K2 | SLIV |
|---|---|---|
| 0 | X | S=0, L=7 |
| 1 | X-1 | S=7, L=7 |
| 2 | X-1 | S=0, L=7 |
| ... | | |
| ... | | |
| ... | | |
| ... | | |
| ... | | |
| ... | | |
| 62 | X-31 | S=7, L=7 |
| 63 | X-31 | S=0, L=7 |

TERMINAL, RADIO COMMUNICATION METHOD, BASE STATION AND SYSTEM FOR TRANSMITTING PHYSICAL UPLINK SHARED CHANNEL BASED ON TIME DOMAIN RESOURCE ALLOCATION LIST

TECHNICAL FIELD

The present disclosure relates to a user terminal and a radio base station in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency and so on (see Non-Patent Literature 1). For the purpose of further high capacity, advancement of LTE (LTE Rel. 8, Rel. 9), and so on, the specifications of LTE-A (LTE-Advanced, LTE Rel. 10, Rel. 11, Rel. 12, Rel. 13) have been drafted.

Successor systems of LTE (referred to as, for example, "FRA (Future Radio Access)," "5G (5th generation mobile communication system)," "5G+(plus)," "NR (New Radio)," "NX (New radio access)," "FX (Future generation radio access)," "LTE Rel. 14," "LTE Rel. 15" (or later versions), and so on) are also under study.

In existing LTE systems (for example, LTE Rel. 8 to Rel. 13), a user terminal (UE (User Equipment)) receives downlink control information indicating allocation of UL data (UL-SCH (Uplink Shared Channel) (which may be also referred to as a UL grant (Uplink grant)) from a radio base station (for example, eNB (eNodeB)), and performs UL data transmission based on the UL grant at a prescribed timing after the reception the UL grant (4 ms after).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), a study is underway to make the UL grant include information indicating a time resource for a PUSCH. Candidates of the time resource are configured by a high layer.

However, a sufficient study has not been made on whether or not the maximum number of candidates of the time resource in the study so far is sufficient. Unless the number of candidates of the time resource and UE operations based on the number are appropriately defined, a communication throughput, a frequency use efficiency, and the like may decrease.

In view of these, an object of the present disclosure is to provide a user terminal and a radio base station capable of appropriately controlling the number of candidates of a PUSCH time domain RA.

Solution to Problem

A user terminal according to an aspect of the present disclosure includes a receiving section that receives downlink control information (DCI) indicating transmission of an uplink shared channel, and a control section that determines that a size of a time domain resource allocation (RA) field included in the DCI is different depending on a format of the DCI to control the transmission of the uplink shared channel based on the field.

Advantageous Effects of Invention

According to one aspect of the present disclosure, the number of candidates of the PUSCH time domain RA can be appropriately controlled.

BRIEF DESCRIPTION OF DRAWINGS

FIGS. 1A and 1B are diagrams to show examples of a configuration of a PUSCH time domain RA list according to one embodiment;

DESCRIPTION OF EMBODIMENTS

Figure 2:
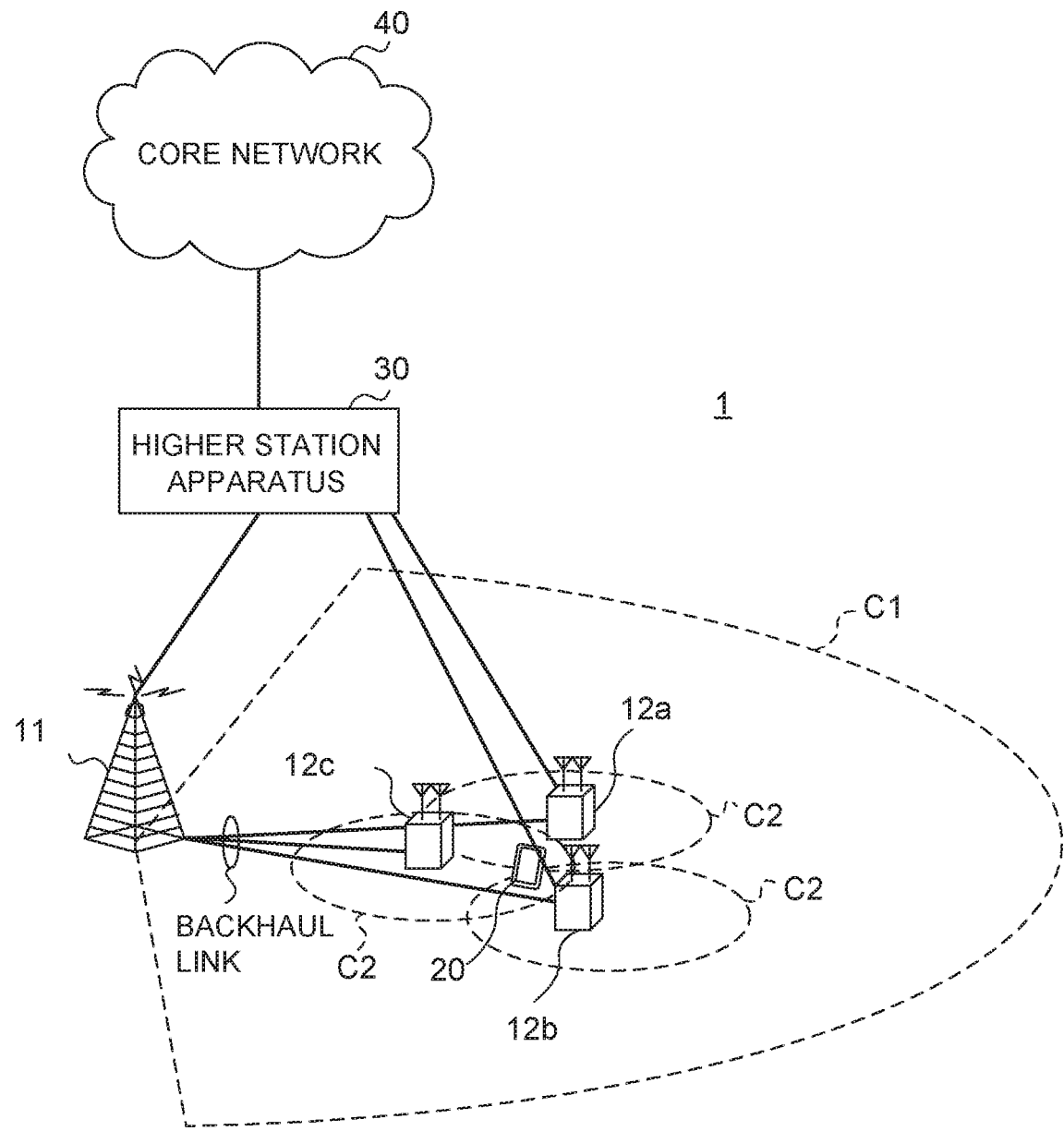
FIG. 2 is a diagram to show an example of a schematic structure of a radio communication system according to one embodiment.

For NR, a study is underway to use beam forming (BF) to perform communication. For example, a UE and/or a base station (for example, gNB (gNodeB)) may use a beam used to transmit a signal (also referred to as transmission beam, Tx beam, and the like), and a beam used to receive a signal (also referred to as reception beam, Rx beam, and the like).

The BF is a technology for forming a beam (antenna directionality) by using, for example, an ultra multielement antenna to control (also referred to as precode) an amplitude and/or phase of a signal transmitted/received from each element. Note that MIMO (Multiple Input Multiple Output) using such an ultra multielement antenna is also referred as massive MIMO.

The BF can be classified into a digital BF and an analog BF. The digital BF is a method of performing precoding signal processing on a baseband (for a digital signal), and can create beams the number of which corresponds to the number of antenna ports (or, RF chains) at any timing.

The analog BF is method of using a phase shift device on an RF (Radio Frequency). In this case, a structure can be easily achieved in a cost-effective manner only by rotating a phase of an RF signal, but a plurality of beams cannot be formed at the same timing.

Note that the digital BF and the analog BF can be used in combination to achieve a hybrid BF structure. It may be expected to be preferable in the massive MIMO in particular because a circuit structure is expensive in a case that an enormous number of beams are formed only by the digital BF.

In NR, the UE may use at least one frequency band (carrier frequency) of a first frequency band (FR1 (Frequency Range 1)) and a second frequency band (FR2 (Frequency Range 2)) to perform communication (transmission/reception and measurement of a signal, and so on).

For example, FR1 may be a frequency band of 6 GHz or less (sub-6 GHz), and FR2 may be a frequency band which is higher than 24 GHz (above-24 GHz). FR1 may be defined as a frequency range using a sub-carrier spacing (SCS) of at least one of 15, 30, and 60 kHz. FR2 may be defined as a frequency range using a SCS of at least one of 60 and 120 kHz. Note that the frequency bands, definitions, and the like of FR1 and FR2 are not limited to those described above, and for example, FR1 may correspond to a frequency band which is higher than FR2.

FR2 may be used only for a time division duplex (TDD) band. FR2 is preferably used in synchronization between a plurality of base stations. In a case that FR2 includes a plurality of carriers, these carriers are preferably used in synchronization.

In FR2, the analog BF is a prospective technology. In view of gNB, the same beam is preferably used for downlink transmission and uplink reception. Here, the downlink transmission corresponds to transmission of a downlink control channel (PDCCH: Physical Downlink Control Channel), a downlink shared channel (PDSCH: Physical Downlink Shared Channel), or the like, for example. The uplink reception corresponds to reception of an uplink control channel (PUCCH: Physical Uplink Control Channel), an uplink shared channel (PUSCH: Physical Uplink Shared Channel), or the like, for example.

Here, in the existing LTE (for example, LTE Rel. 8 to Rel. 13), the timings of the transmission of a PUCCH (for example, HARQ-ACK) corresponding to the reception of a PDSCH (or a PDCCH for scheduling the PDSCH) in the UE, the transmission of a PUSCH corresponding to the reception of a PDCCH in the UE, and the like have been defined by a specification in advance as four subframes after the reception.

On the other hand, for NR, a study is underway to make the downlink control information (DCI) reported on the PDCCH include information on time domain resource allocation (RA) of the corresponding PUSCH or PUCCH (which may be referred to as information indicating a transmission timing).

For example, for NR, a study is underway to configure for the UE with a list of time domain allocations for timing of UL assignment to UL data through higher layer signaling. The list may be referred to as a PUSCH time domain RA list.

Here, for example, the higher layer signaling may be any one or combinations of RRC (Radio Resource Control) signaling, MAC (Medium Access Control) signaling, broadcast information, and the like.

For example, the MAC signaling may use MAC control elements (MAC CE), MAC PDUs (Protocol Data Units), and the like. The broadcast information may be, for example, master information block (MIB), system information block (SIB), minimum system information (RMSI (remaining minimum system information)), other system information (OSI), and the like.

The PUSCH time domain RA list may correspond to a "pusch-AllocationList" information element (IE) of RRC signaling. The PUSCH time domain RA list containing up to 16 candidates of the PUSCH time domain RA (may be also referred to as sequence element, entry, or the like) is under study.

Each candidate corresponds to an IE for configuring a time domain relation between a PDCCH and a PUSCH ("PUSCH-TimeDomainResourceAllocation" IE). The IE may include, for example, a parameter K2 (a difference between timings of a slot that receives a PDCCH and a slot that transmits a PUSCH), a mapping type indicating a mapping structure of a demodulation reference signal (DMRS), a value indicating a PUSCH start symbol and a length in units of symbols (also referred to as SLIV (Start/Length Indication Value), and the like.

A DCI format for scheduling an uplink data transmission (DCI format 0_0 and DCI format 0_1) containing a time domain RA field indicating an index of the PUSCH time domain RA list described above is under study. A size of the field of 4 bits in order to support up to 16 entries is under study. The index may be referred to as a PUSCH time resource indication information.

Note that DCI format 0_0 may be interpreted as languages such as a fallback DCI, a fallback UL grant, and a DCI format used for scheduling PUSCH in one cell. The fallback DCI may be, for example, DCI which is transmitted in at least one of a common search space (C-SS) and UE-specific search space (UE-SS), and a structure of which cannot be configured through UE-specific higher layer signaling.

The UE-SS may mean a search space configured per UE, and the C-SS may mean a search space configured commonly to a plurality of UEs. Alternatively, the UE-SS may mean a search space for which a resource, to which the search space is mapped, is determined based on at least one of a cell-radio network temporary identifier (C-RNTI) and a user terminal identifier (UE-ID (UE Identifier)), and the C-SS may mean a search space for which a resource not based on the C-RNTI and the UE-ID is used. Alternatively, the UE-SS may mean a search space configured based on UE individual higher layer signaling, and the C-SS may mean a search space configured based on UE common higher layer signaling such as the broadcast information.

DCI format 0_1 may be interpreted as languages such as a non-fallback DCI, a non-fallback UL grant, and a DCI format larger in a payload (the number of bits) than DCI format 0_0. The non-fallback DCI may be, for example, DCI which is transmitted in the UE-SS, and a structure (contents, payload, and the like) of which can be configured through UE-specific higher layer signaling (RRC signaling).

Note that the structure (contents, payload, and the like) of the fallback DCI also can be configured through UE common higher layer signaling (for example, broadcast information, system information, and the like).

As described above, in NR, the PUSCH resource can be adjusted by use of the PUSCH time domain RA list. A sufficient study has not been made on whether or not the up to 16 RA candidates is sufficient. The inventors of the present invention have studied as below.

For example, it is not preferable that a DL/UL beam pattern is fixed. It is preferable that the beam pattern is determined by gNB based on a traffic difference between the beams. Accordingly, in order to achieve a DL/UL beam pattern flexible in terms of time, it is preferable that the number of candidates of the PUSCH time domain RA is made large.

It is not preferable that a time difference between DL and UL is fixed for a beam. It is preferable that the DL/UL assignment in the beam pattern is determined by gNB, based on a traffic difference between DL and UL. Accordingly, in order to achieve a DL/UL assignment flexible in terms of beam, it is preferable that the number of candidates of the PUSCH time domain RA is made large.

It is not preferable that the SLIV is fixed. In consideration of the traffic difference between the beams, it is preferable that a length of a PUSCH (duration) is flexible. A short duration causes a higher DMRS overhead due to many beams in a UL burst. Accordingly, in order to achieve a flexible PUSCH duration, it is preferable that the number of candidates of the PUSCH time domain RA is made large.

Nonetheless, it is not preferable that the number of candidates of the PUSCH time domain RA is made always large, in view of communication overhead. Unless the number of candidates of the PUSCH time domain RA and the UE operation based on the number are appropriately defined, the communication throughput, the frequency use efficiency and the like may decrease.

As such, the inventors of the present invention came up with the idea of a method for appropriately control (configure) the number of candidates of the PUSCH time domain RA.

Hereinafter, embodiments according to the present disclosure will be described in detail with reference to the drawings. The radio communication method according to each embodiment may be employed independently or may be employed in combination.

(Radio Communication Method)

In one embodiment, the number of RA candidates included in the PUSCH time domain RA list may exceed 16. In this case, the number of bits of the time domain RA field included in the DCI may exceed 4 bits.

For example, the number of bits of the time domain RA field in DCI format 0_1 may be 6 bits, and the UE may determine one of up to 64 entries included in the PUSCH time domain RA list, based on a value of the time domain RA field.

Note that "64" described herein may be interpreted as any numeral larger than "16". The number of bits of the time domain RA field in this case may be interpreted as N (satisfying the any numeral $\leq 2^N$).

In one embodiment, the number of bits of the time domain RA field in DCI format 0_0 may be different from the number of bits of the time domain RA field in DCI format 0_1. For example, the number of bits of the time domain RA field in DCI format 0_0 may be not more than or less than the number of bits of the time domain RA field in DCI format 0_1. For example, the number of bits of the time domain RA field in DCI format 0_0 may be fixed to a certain vale (for example, 4) (or may be defined by a specification), or may be defined as up to 4 bits.

In one embodiment, a time domain RA field (Msg3 PUSCH time resource allocation field) for a UL transmission indication (UL grant) included in a random access response (RAR) used during a random access procedure may be the same as the number of bits of the time domain RA field in DCI format 0_0, or may be fixed to a certain value (for example, 4) (or may be defined by a specification).

Note that the UL grant included in the RAR is information for scheduling a PUSCH for message 3 in the random access procedure, and may be referred to as a RAR UL grant, a RAR grant field, and the like. The RAR may be reported by use of at least one of MAC CE and MAC PDU. The UE transmits message 3 (control message by higher layer) using a UL resource specified by the RAR UL grant.

The UE may reference a different PUSCH time domain RA list or the same PUSCH time domain RA list for the different DCI format. The UE may reference a different PUSCH time domain RA list even for the same DCI format, based on a certain condition.

For example, the UE may use, for DCI format 0_0 received (detected) in the U-SS, at least a part of the same PUSCH time domain RA list referenced for DCI format 0_1.

For example, the UE may determine one of particular 16 entries of up to 64 entries included in the PUSCH time domain RA list referenced for DCI format 0_1, based on a value of the time domain RA field in DCI format 0_0 received in the U-SS. Here, the particular 16 entries may be the first 16 entries included in the PUSCH time domain RA list referenced for DCI format 0_1.

The UE may use at least a part of the same PUSCH time domain RA list referenced for DCI format 0_1 (for example, particular 16 entries described above) for DCI format 0_0 that is received in the C-SS and is with CRC (Cyclic Redundancy Check) scrambled by a cell-radio network temporary identifier (C-RNTI).

The UE may use the PUSCH time domain RA list different from that referenced for DCI format 0_1, for DCI format 0_0 (or DCI format 0_0 used during the random access procedure) that is received in the C-SS and is with CRC scrambled by a temporary C-RNTI(TC-RNTI).

For example, the UE may determine one of up to 16 entries included in a list different from the PUSCH time domain RA list referenced for DCI format 0_1, based on a value of the time domain RA field in DCI format 0_0 that is received in the C-SS and is with CRC scrambled by the TC-RNTI.

The UE may use, for the RAR UL grant, the PUSCH time domain RA list different from that referenced for DCI format 0_1.

Note that the UE may reference always the PUSCH time domain RA list having 16 entries for DCI format 0_0, regardless of the search space in which DCI format 0_0 is received (whether the C-SS or the UE-SS).

Configuration Example

Hereinafter, an example of a specific configuration will be described. FIGS. 1A and 1B are diagrams to show examples of a configuration of the PUSCH time domain RA list according to one embodiment. Note that the mapping type is omitted in FIGS. 1A and 1B. The values of K2 and SLIV are not limited to those shown in the figures.

pusch-AllocationList included in an IE used for configuring a cell-specific PUSCH parameter ("PUSCH-ConfigCommon" IE) may be defined as "SEQUENCE (SIZE (1 . . . 16)) OF PUSCH-TimeDomainResourceAllocation". Note that a notation for the IE in the present disclosure complies with ASN.1 (Abstract Syntax Notation One).

FIG. 1A corresponds to the PUSCH time domain RA list configured according to pusch-AllocationList included in the "PUSCH-ConfigCommon" IE. The number of candidates of the RA list is 16.

On the other hand, pusch-AllocationList included in an IE used for configuring a UE-specific PUSCH parameter ("PUSCH-Config" IE) may be defined as "SEQUENCE (SIZE (1 . . . maxNrofUL-Allocations)) OF PUSCH-TimeDomainResourceAllocation". Here, maxNrofUL-Allocations is an integer indicating the maximum number of the PUSCH time domain RA candidates, and may be defined as 64, for example.

Specifically, the UE may assume that at least a part of pusch-AllocationList included in the "PUSCH-ConfigCommon" IE is not overwritten (overridden) by pusch-AllocationList included in the "PUSCH-Config" IE.

FIG. 1B corresponds to the PUSCH time domain RA list configured according to pusch-AllocationList included in the "PUSCH-Config" IE. The number of candidates of the RA list is 64.

In a case that the UE detects DCI format 0_1, the UE may determine that the number of bits of the time domain RA field in the relevant DCI is 6 bits to determine a PUSCH time resource based on the list in FIG. 1B and a value of the time domain RA field, and transmit data using the PUSCH being a time resource.

In a case that the UE detects DCI format 0_0 in the U-SS, or detect DCI format 0_0 with CRC scrambled by a C-RNTI in the C-SS, the UE may determine that the number of bits of the time domain RA field in the relevant DCI is 4 bits to determine a PUSCH time resource based on the first 16 entries in the list in FIG. 1B and a value of the time domain RA field, and transmit data using the PUSCH being a time resource.

In a case that the UE detects DCI format 0_0 with CRC scrambled by a TC-RNTI in the C-SS, or receives the RAR UL grant, the UE may determine that the number of bits of the time domain RA field in the relevant DCI (or the UL grant) is 4 bits to determine a PUSCH time resource based on the list in FIG. 1A and a value of the time domain RA field, and transmit data using the PUSCH being a time resource.

According the one embodiment describe above, a granularity of the time domain allocation list to be used can be adaptively changed in accordance with the DCI format type, whether or not the UE-specific PUSCH (or whether or not scheduling DCI is transmitted in the UE-SS), and the like.

Note that the PUSCH in the present disclosure may include UCI on PUSCH without uplink data (UCI on PUSCH without UL-SCH). In this case, the "data" may be interpreted as "uplink control information (UCI)".

(Radio Communication System)

Hereinafter, a structure of a radio communication system according to one embodiment of the present disclosure will be described. In this radio communication system, any of the radio communication methods according to each embodiment of the present disclosure described above may be used alone or may be used in combination for communication.

FIG. 2 is a diagram to show an example of a schematic structure of the radio communication system according to one embodiment. A radio communication system 1 can adopt at least one of carrier aggregation (CA) and dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 can execute CA or DC by using a plurality of cells (CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

The user terminals 20 can perform communication by using at least one of time division duplex (TDD) and frequency division duplex (FDD) in each cell. Furthermore, in each cell (carrier), a single numerology may be employed, or a plurality of different numerologies may be employed.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and at least one of single carrier frequency division multiple access (SC-FDMA) and OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink control channels and so on, are used as downlink channels. User data, higher layer control information, SIBs (System Information Blocks) and so on are communicated on the PDSCH. The MIBs (Master Information Blocks) are communicated on the PBCH.

The downlink control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. The downlink control information (DCI) including scheduling information of at least one of a PDSCH and a PUSCH, and so on are communicated on the PDCCH.

For example, the DCI for scheduling DL data reception may be referred to as "DL assignment," and the DCI for scheduling UL data transmission may be referred to as "UL grant."

The number of OFDM symbols used for the PDCCH may be communicated on the PCFICH. Acknowledgment information (for example, also referred to as "retransmission control information," "HARQ-ACK," "ACK/NACK," and so on) of HARQ (Hybrid Automatic Repeat reQuest) to the PUSCH may be communicated on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio quality information (CQI (Channel Quality Indicator)) of the downlink, transmission confirmation information, scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

(Radio Base Station)

Figure 3:
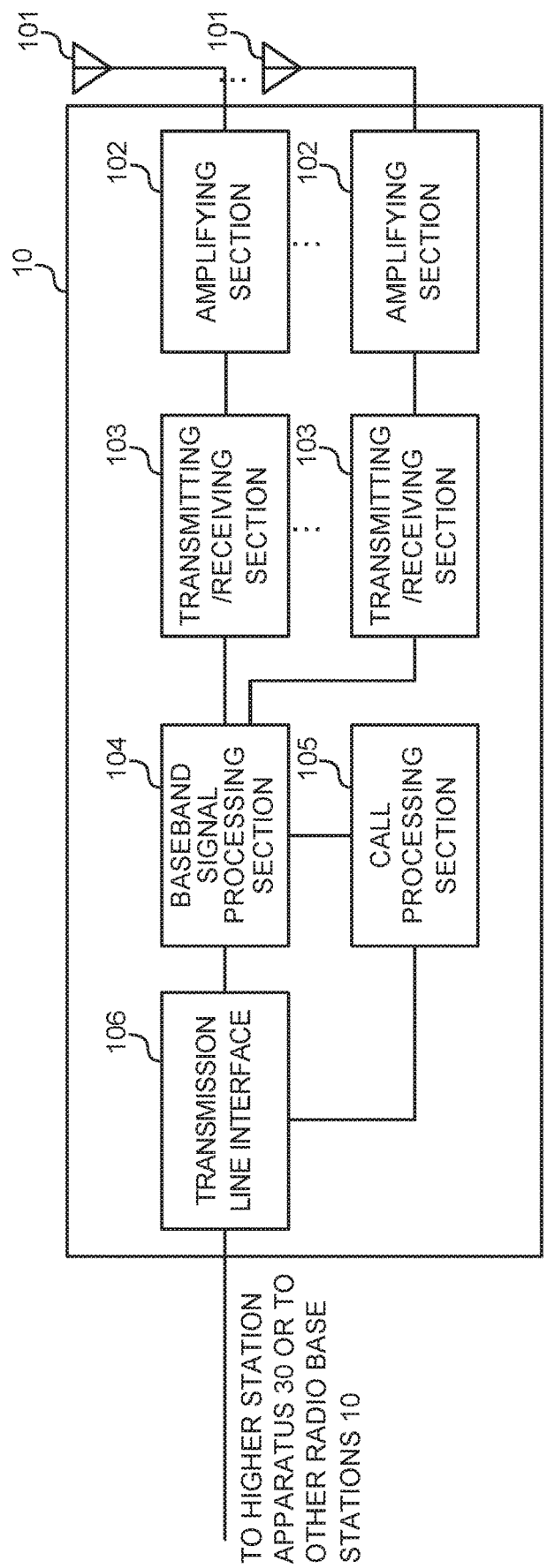
FIG. 3 is a diagram to show an example of an overall structure of a radio base station according to one embodiment.

FIG. 3 is a diagram to show an example of an overall structure of the radio base station according to one embodiment. A radio base station 10 includes a plurality of transmitting/receiving antennas 101, amplifying sections 102, transmitting/receiving sections 103, a baseband signal processing section 104, a call processing section 105, and a transmission line interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the transmission line interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present disclosure pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the transmission line interface 106. The call processing section 105 performs call processing (setting up, releasing and so on) for communication channels, manages the state of the radio base station 10, manages the radio resources and so on.

The transmission line interface 106 transmits and/or receives signals to and/or from the higher station apparatus 30 via a certain interface. The transmission line interface 106 may transmit and/or receive signals (backhaul signaling) with other radio base stations 10 via an inter-base station interface (for example, an optical fiber in compliance with the CPRI (Common Public Radio Interface) and an X2 interface).

Figure 4:
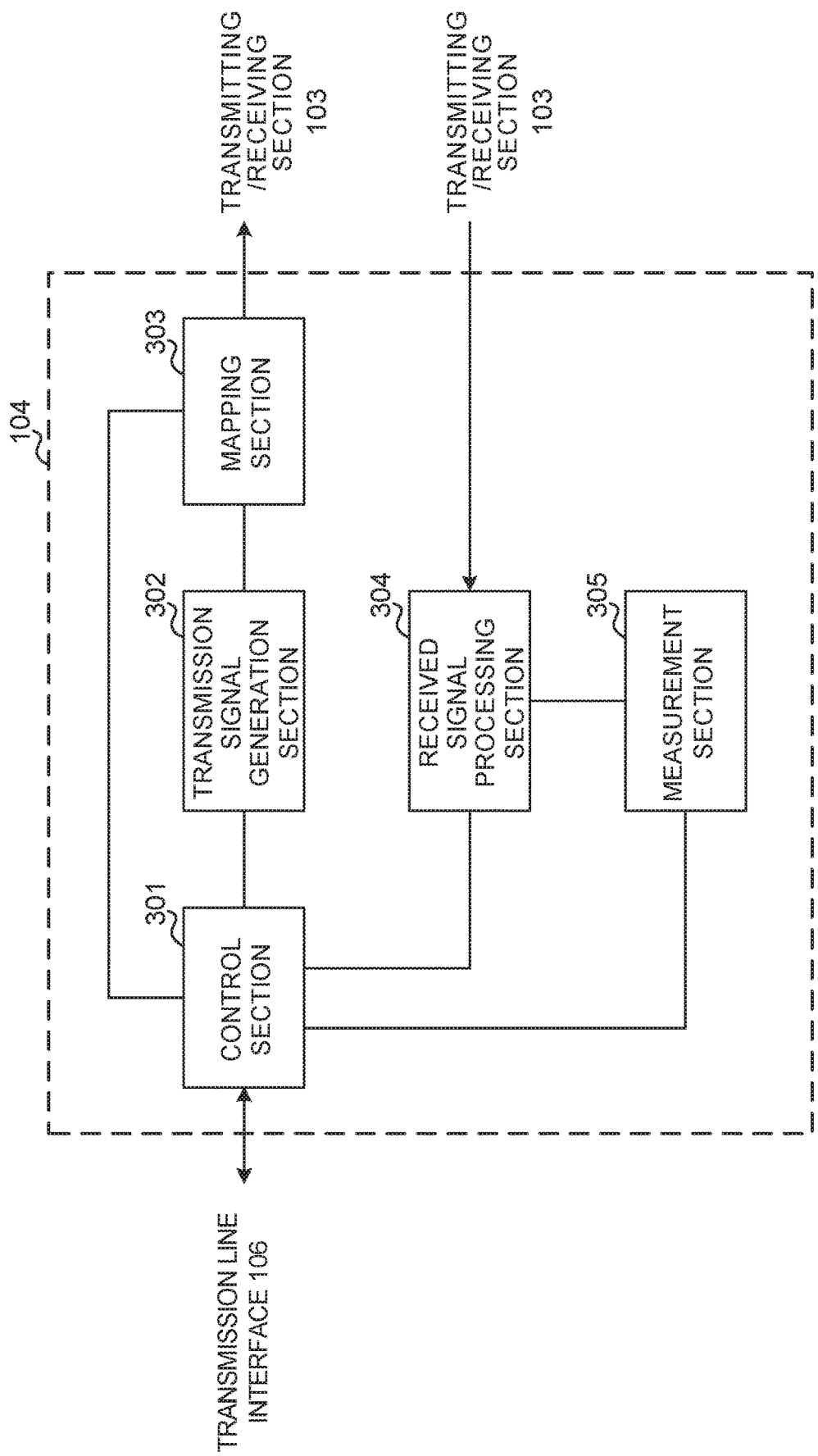
FIG. 4 is a diagram to show an example of a functional structure of the radio base station according to one embodiment.

FIG. 4 is a diagram to show an example of a functional structure of the radio base station according to one embodiment of the present disclosure. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present disclosure pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls scheduling (for example, resource allocation) of system information, a downlink data signal (for example, a signal transmitted using a downlink shared channel), and a downlink control signal (for example, a signal transmitted using downlink control channel). Based on the results of determining necessity or not of retransmission control to the uplink data signal, or the like, the control section 301 controls generation of a downlink control signal, a downlink data signal, and so on.

The control section 301 controls the scheduling of a synchronization signal (for example, PSS (Primary Synchronization Signal)/SSS (Secondary Synchronization Signal)), a downlink reference signal (for example, CRS, CSI-RS, DMRS), and so on.

The control section 301 controls scheduling of an uplink data signal (for example, a signal transmitted using an uplink shard channel), an uplink control signal (for example, a signal transmitted using an uplink control channel), a random access preamble, an uplink reference signal, and so on.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present disclosure pertains.

For example, the transmission signal generation section 302 generates at least one of the DL assignment to report assignment information of downlink data and the UL grant to report assignment information of uplink data, based on commands from the control section 301. The DL assignment and the UL grant are both DCI, and follow the DCI format.

For a downlink data signal, encoding processing and modulation processing are performed in accordance with a coding rate, modulation scheme, or the like determined based on channel state information (CSI) from each user terminal 20.

The mapping section 303 maps the downlink signals generated in the transmission signal generation section 302 to certain radio resources, based on commands from the control section 301, and outputs these to the transmitting/receiving sections 103. The mapping section 303 can include a mapper, a mapping circuit, or a mapping apparatus that can be described based on general understanding of the technical field to which the present disclosure pertains.

The received signal processing section 304 performs a receiving process (for example, demapping, demodulation, decoding, and so on) on the received signals input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present disclosure pertains.

The received signal processing section 304 outputs the information decoded in the receiving process to the control section 301. For example, if the received signal processing section 304 receives the PUCCH including HARQ-ACK, the received signal processing section 304 outputs the HARQ-ACK to the control section 301. The received signal processing section 304 outputs at least one of the received signals and the signals after the receiving processes to the measurement section 305.

The measurement section 305 conducts measurements on the received signals. The measurement section 305 can be constituted with a measurer, a measurement circuit or measurement apparatus that can be described based on general understanding of the technical field to which the present disclosure pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 301.

Note that the transmitting/receiving sections 103 may further include an analog beamforming section performing analog beamforming. The analog beamforming section can be constituted with an analog beamforming circuit (for example, a phase shifter, a phase shift circuit), or an analog beamforming apparatus (for example, a phase shift device) that can be described based on general understanding of the technical field to which the present disclosure pertains. The transmitting/receiving antennas 101 can be formed of an antenna array, for example. The transmitting/receiving sections 103 are configured to adopt a single BF and a multi BF.

The transmitting/receiving sections 103 may transmit a signal using a transmission beam, or may receive a signal using a reception beam. The transmitting/receiving sections 103 may transmit and/or receive a signal using a certain beam determined by the control section 301.

The control section 301 may control forming the transmission beam and/or the reception beam using a digital BF by the baseband signal processing section 104 (for example, precoding) and/or an analog BF by the transmitting/receiving section 103 (for example, phase rotation).

The transmitting/receiving sections 103 may transmit the downlink control information (DCI) indicating transmission of the uplink shared channel (PUSCH). The transmitting/receiving sections 103 may receive the PUSCH transmitted based on the DCI.

The control section 301 may control a size of a time domain resource allocation (RA) field included in the DCI to be differentiated depending on a format of the DCI.

(User Terminal)

Figure 5:
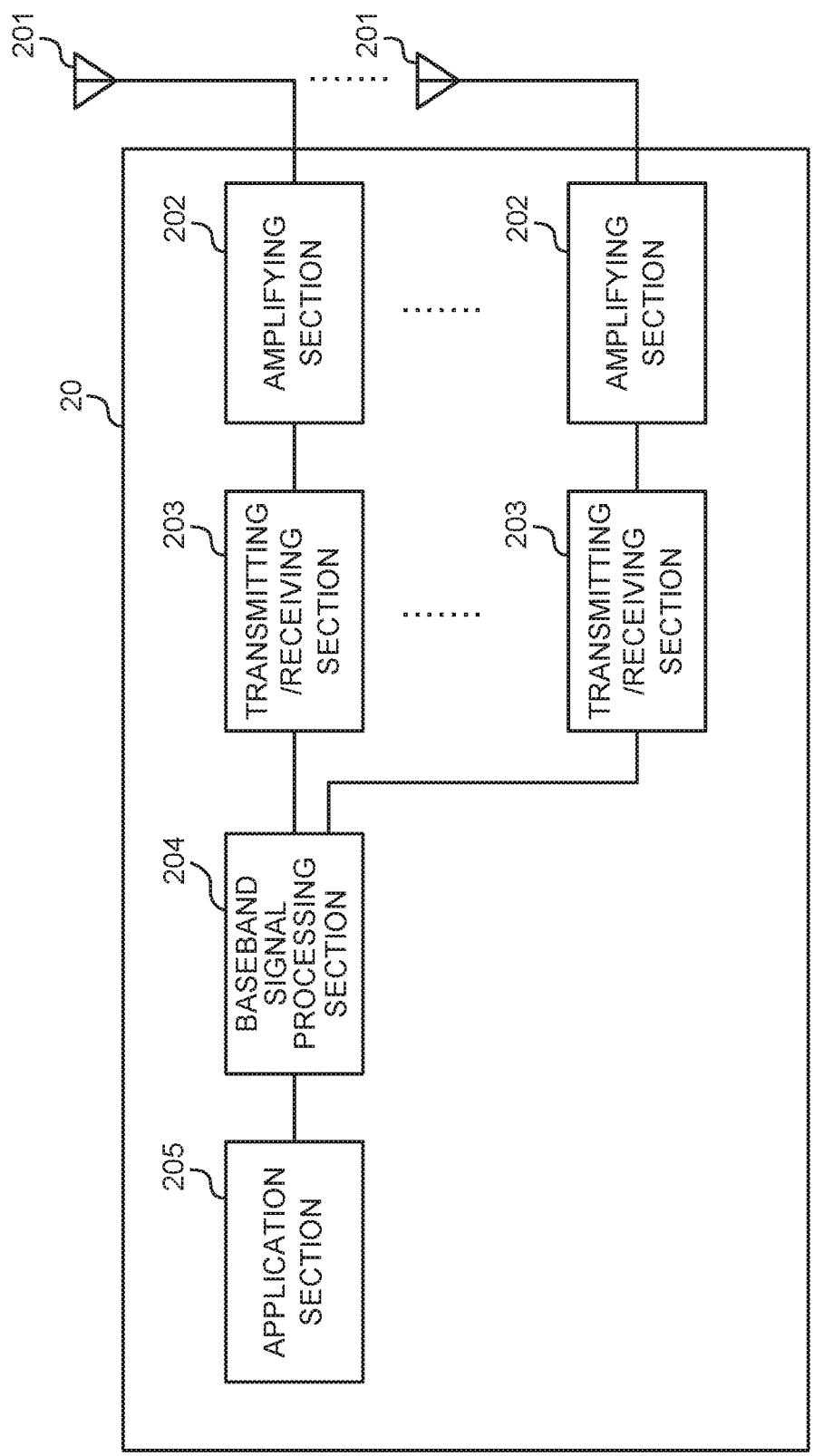
FIG. 5 is a diagram to show an example of an overall structure of a user terminal according to one embodiment.

FIG. 5 is a diagram to show an example of an overall structure of a user terminal according to one embodiment. A user terminal 20 includes a plurality of transmitting/receiving antennas 201, amplifying sections 202, transmitting/receiving sections 203, a baseband signal processing section 204, and an application section 205. Note that the user terminal 20 may be configured to include one or more transmitting/receiving antennas 201, one or more amplifying sections 202, and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present disclosure pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

Figure 6:
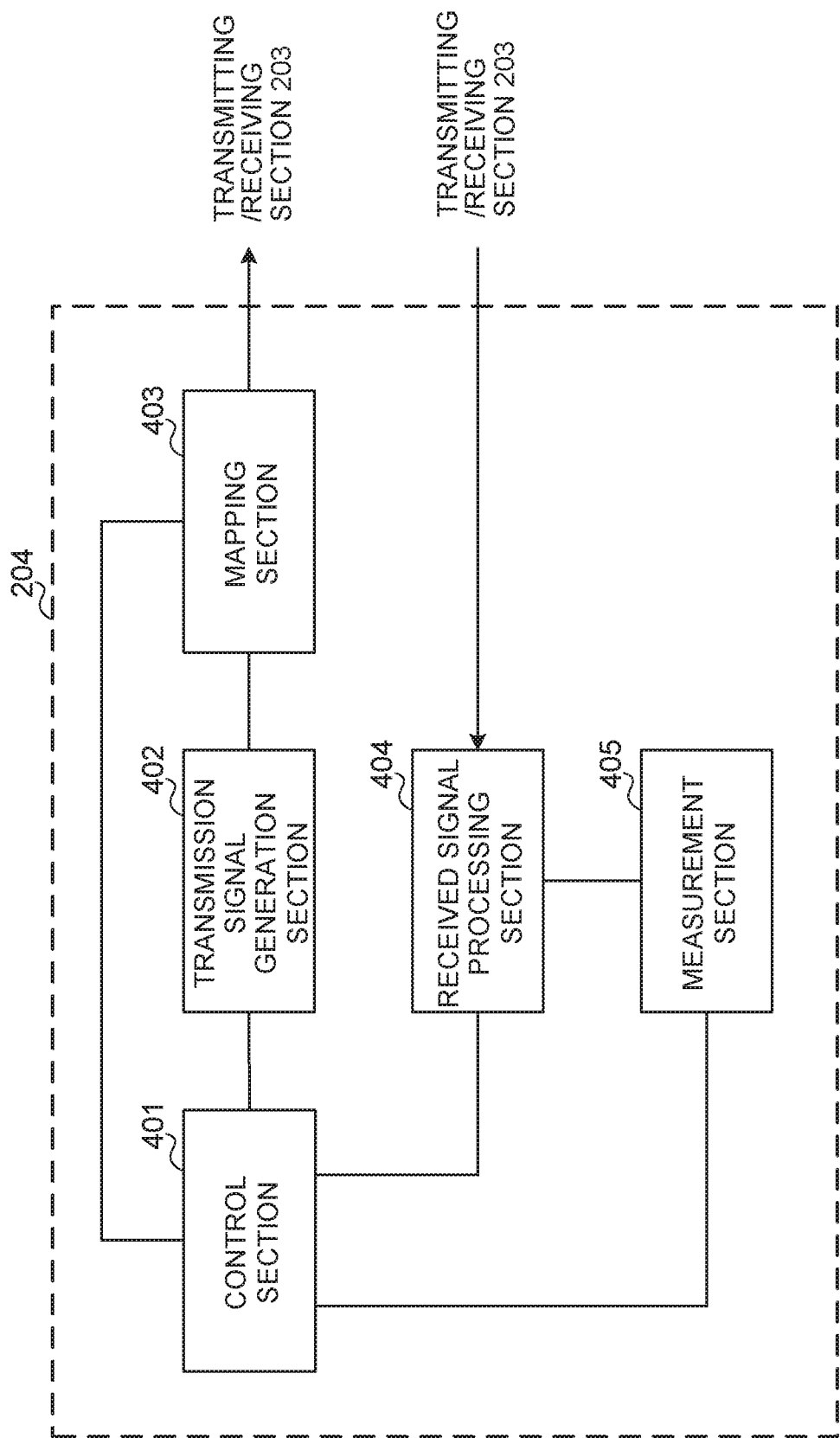
FIG. 6 is a diagram to show an example of a functional structure of the user terminal according to one embodiment.

FIG. 6 is a diagram to show an example of a functional structure of a user terminal according to one embodiment. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present disclosure pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal, a downlink data signal and the like transmitted from the radio base station 10, from the received signal processing section 404. The control section 401 controls generation of an uplink control signal, an uplink data signal, and the like, based on the results of determining necessity or not of retransmission control to a downlink data signal.

If the control section 401 acquires a variety of information reported by the radio base station 10 from the received signal processing section 404, the control section 401 may update parameters to use for control, based on the information.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present disclosure pertains.

For example, the transmission signal generation section 402 generates an uplink control signal about transmission confirmation information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present disclosure pertains.

The received signal processing section 404 performs a receiving process (for example, demapping, demodulation, decoding, and so on) on the received signals input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present disclosure pertains. The received signal processing section 404 can constitute the receiving section according to the present disclosure.

The received signal processing section 404 outputs the information decoded in the receiving process to the control section 401. The received signal processing section 404 outputs, for example, broadcast information, system information, RRC signaling, DCI and so on, to the control section 401. The received signal processing section 404 outputs at least one of the received signals and the signals after the receiving processes to the measurement section 405.

The measurement section 405 conducts measurements on the received signals. The measurement section 405 can include a measurer, a measurement circuit, or a measurement apparatus that can be described based on general understanding of the technical field to which the present disclosure pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

Note that each transmitting/receiving section 203 may further include an analog beamforming section performing analog beamforming. The analog beamforming section can include an analog beamforming circuit (for example, a phase shifter, a phase shift circuit), or an analog beamforming apparatus (for example, a phase shift device) that can be described based on general understanding of the technical field to which the present disclosure pertains. The transmitting/receiving antennas 201 can be formed of an antenna array, for example. Each transmitting/receiving section 203 is configured to adopt a single BF and a multi BF.

Each transmitting/receiving section 203 may transmit a signal using a transmission beam, or may receive a signal using a reception beam. Each transmitting/receiving section 203 may transmit and/or receive a signal using a certain beam determined by the control section 401.

The control section 401 may control forming the transmission beam and/or the reception beam using a digital BF by the baseband signal processing section 204 (for example, precoding) and/or an analog BF by the transmitting/receiving section 203 (for example, phase rotation).

The transmitting/receiving sections 203 may receive the downlink control information (DCI) indicating transmission of the uplink shared channel (PUSCH). The transmitting/receiving sections 203 may transmit the PUSCH based on the DCI.

The control section 401 may determine that the size of the time domain resource allocation (RA) field included in the downlink control information (DCI) acquired from the received signal processing section 404 is different depending on the format of the DCI to control the PUSCH transmission (for example, control the transmission time, the transmission timing, and the like) based on the relevant field.

The control section 401 may assume that the size of the field is up to 6 bits in a case that the format of the DCI is DCI format 0_1.

The control section 401 may assume that the size of the field is 4 bits in a case that the format of the DCI is DCI format 0_0.

In a case that the DCI is received in a user terminal-specific search space, or the DCI is received in a common search space and is with CRC (Cyclic Redundancy Check) scrambled by a C-RNTI (Cell-Radio Network Temporary Identifier), the control section 401 may control the transmission of the uplink shared channel based on a time domain RA candidate list for DCI format 0_1.

In a case that the DCI is received in a common search space and is with CRC scrambled by a TC-RNTI (Temporary C-RNTI), or the DCI is included in a random access response, the control section 401 may control the transmission of the uplink shared channel based on a time domain RA candidate list different from the time domain RA candidate list for DCI format 0_1.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus.

Figure 7:
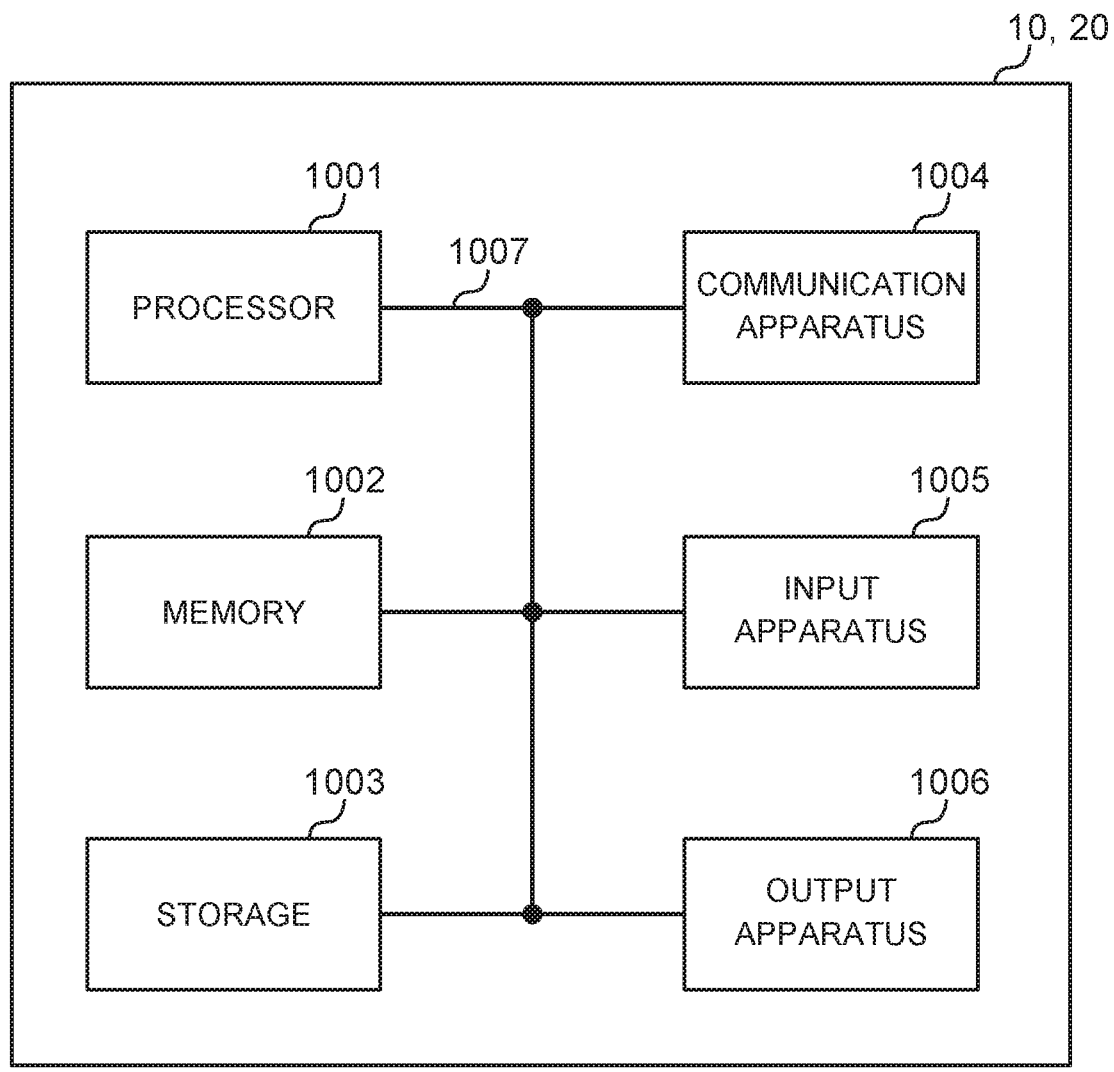
FIG. 7 is a diagram to show an example of a hardware structure of the radio base station and the user terminal according to one embodiment.

For example, a radio base station, a user terminal, and so on according to one embodiment of the present disclosure may function as a computer that executes the processes of the radio communication method of the present disclosure. FIG. 7 is a diagram to show an example of a hardware structure of the radio base station and the user terminal according to one embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminal 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving antennas 101 (201), amplifying sections 102 (202), transmitting/receiving sections 103 (203), transmission line interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, at least one of "channels" and "symbols" may be replaced by "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, the numerology may be communication parameters applied to at least one of transmission and reception of a certain signal or channel. For example, the numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may include symbols the number of which is smaller than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms.

For example, one subframe may be referred to as a "transmission time interval (TTI)," a plurality of consecutive subframes may be referred to as a "TTI" or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain.

Also, an RB may include one or a plurality of symbols in the time domain, and may be one slot, one mini-slot, one subframe, or one TTI in length. One TTI and one subframe each may be constituted of one or a plurality of resource blocks.

Note that one or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. For example, since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure are used interchangeably.

In the present disclosure, the terms such as a "base station (BS)," a "radio base station," a "fixed station," a "NodeB," an "eNodeB (eNB)," a "gNodeB (gNB)," an "access point," a "transmission point," a "reception point," a "transmission/reception point," a "cell," a "sector," a "cell group," a "carrier," a "component carrier," a "bandwidth part (BWP)," and so on can be used interchangeably. The base station may be referred to as the terms such as a "macro cell," a small cell," a "femto cell," a "pico cell," and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal," and the like may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be also referred to as a transmission apparatus, a reception apparatus, and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation.

Furthermore, the radio base station in the present disclosure may be interpreted as a user terminal. For example, each aspect/embodiment of the present disclosure may be applied to a configuration in which communication between a radio base station and a user terminal is replaced with communication among a plurality of user terminals (which may be referred to as D2D (device-to-device) or V2X (vehicle-to-everything)). In this case, the user terminals 20 may have the functions of the radio base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as the radio base station. In this case, the radio base stations 10 may have the functions of the user terminals 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." The terms "separate," "be coupled" and so on may be interpreted similarly.

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
   a receiving section that receives information used for scheduling of a physical uplink shared channel (PUSCH); and
   a processor that, when the information comprises downlink control information (DCI) format 0_0 received in a User Equipment(UE)-specific search space or when the information comprises DCI format 0_0 received in a common search space and having a Cyclic Redundancy Check (CRC) scrambled by Cell-Radio Network Temporary Identifier (C-RNTI), controls transmission of the PUSCH by determining, based on a field in the DCI format 0_0 that indicates an index of a time domain resource allocation list referenced for DCI format 0_1, an entry included in the time domain resource allocation list.

2. The terminal according to claim 1, wherein when the information comprises an uplink (UL) grant included in a random access response, the processor controls the transmission of the PUSCH by determining, based on a field in the UL grant that indicates an index of another time domain resource allocation list that is different from the time domain resource allocation list referenced for the DCI format 0_1, an entry included in the other time domain resource allocation list.

3. A radio communication method for a terminal, comprising:
   receiving information used for scheduling of a physical uplink shared channel (PUSCH); and
   when the information comprises downlink control information (DCI) format 0_0 received in a User Equipment (UE)-specific search space or when the information comprises DCI format 0_0 received in a common search space and having a Cyclic Redundancy Check (CRC) scrambled by Cell-Radio Network Temporary Identifier (C-RNTI), controlling transmission of the PUSCH by determining, based on a field in the DCI format 0_0 that indicates an index of a time domain resource allocation list referenced for DCI format 0_1, an entry included in the time domain resource allocation list.

4. A base station comprising:
   a transmitter that transmits information used for scheduling of a physical uplink shared channel (PUSCH) to a terminal; and
   a receiver that, when the information comprises downlink control information (DCI) format 0_0 transmitted in a User Equipment(UE)-specific search space or when the information comprises DCI format 0_0 transmitted in a common search space and having a Cyclic Redundancy Check (CRC) scrambled by Cell-Radio Network Temporary Identifier (C-RNTI), receives the PUSCH based on an index of a time domain resource allocation list referenced for DCI format 0_1, the index being indicated by a field in the DCI format 0_0.

5. A system comprising:
   a terminal that comprises:
      a receiver that receives information used for scheduling of a physical uplink shared channel (PUSCH); and
      a processor that, when the information comprises downlink control information (DCI) format 0_0 received in a User Equipment(UE)-specific search space or when the information comprises DCI format 0_0 received in a common search space and having a Cyclic Redundancy Check (CRC) scrambled by Cell-Radio Network Temporary Identifier (C-RNTI), controls transmission of the PUSCH a by determining, based on a field in the DCI format 0_0 that indicates an index of a time domain resource allocation list referenced for DCI format 0_1, an entry included in the time domain resource allocation list; and a base station that comprises:
  a transmitter that transmits the information to the terminal; and
  a receiver receives the PUSCH.

* * * * *